United States Patent [19]
von Bonin et al.

[11] Patent Number: 5,580,661
[45] Date of Patent: *Dec. 3, 1996

[54] FIREPROOFING GLASSES CONTAINING SPECIAL GELS AND THE PREPARATION OF FIREPROOFING GLASSES OF THIS TYPE

[75] Inventors: Wulf von Bonin, Odenthal; Roland Leroux, Stadecken-Elsheim; Thomas M. Karschti, Budenheim; Markus Steigenberger, Bischofsheim, all of Germany

[73] Assignees: Schott Glaswerke, Mainz; Bayer Aktiengesellschaft, Leverkusen, both of Germany

[ * ] Notice: The term of this patent shall not extend beyond the expiration date of Pat. No. 5,328,719.

[21] Appl. No.: 143,424

[22] Filed: Oct. 26, 1993

[30]  Foreign Application Priority Data

Nov. 2, 1992 [DE] Germany ............................ 42 36 936.3
Mar. 11, 1993 [DE] Germany ............................ 43 07 631.9

[51] Int. Cl.⁶ ..................................... B32B 17/06
[52] U.S. Cl. .......................... 428/427; 428/432; 428/704; 428/921; 252/604; 252/606; 252/610; 156/99; 156/109
[58] Field of Search ..................... 428/427, 432, 428/921, 920, 70, 71, 34, 704; 252/604, 606, 610; 52/786.1; 156/99, 109

[56]  References Cited

U.S. PATENT DOCUMENTS

| | | | |
|---|---|---|---|
| 3,997,700 | 12/1976 | Jacquemin | 428/332 |
| 4,144,074 | 3/1979 | Itoh | 106/1.17 |
| 4,190,698 | 2/1980 | De Boel | 428/334 |
| 4,725,382 | 2/1988 | Lewchalermwong | 252/607 |
| 4,913,847 | 4/1990 | Tünker | 252/606 |
| 4,935,457 | 6/1990 | Metzner | 524/14 |
| 5,151,225 | 9/1992 | Herndon et al. | 252/607 |
| 5,156,775 | 10/1992 | Blount | 252/609 |
| 5,182,049 | 1/1993 | von Bonin | 252/378 R |
| 5,328,719 | 7/1994 | von Bonin | 427/165 |

FOREIGN PATENT DOCUMENTS

| | | |
|---|---|---|
| 306677 | 7/1988 | European Pat. Off. . |
| 468259 | 7/1991 | European Pat. Off. . |
| 527401 | 7/1992 | European Pat. Off. . |
| 4020459 | 1/1992 | Germany . |
| 4023310 | 1/1992 | Germany . |
| 4126702 | 2/1993 | Germany . |

OTHER PUBLICATIONS

Derwent Abstract, Week 7646, AN 76–85658 & JP–A–760 928, Sep. 28, 1976.

*Primary Examiner*—Ellis Robinson
*Assistant Examiner*—Leonidas J. Jones, III
*Attorney, Agent, or Firm*—Sprung Horn Kramer & Woods

[57]  ABSTRACT

Fireproofing glasses containing gels free from organic gel formers are characterized in that they have been prepared with gel formers which contain
a) acidic aluminium phosphates and
b) reaction products of boric acid with alkanolamines,
a) and b) being present in a weight ratio of 100:55 to 100:0.5, calculated as solids.

11 Claims, No Drawings

FIREPROOFING GLASSES CONTAINING SPECIAL GELS AND THE PREPARATION OF FIREPROOFING GLASSES OF THIS TYPE

FIELD OF THE INVENTION

The present invention relates to fireproofing glasses with fireproofing gels, containing water, aluminium phosphate, boron and an amine, and the preparation of fireproofing glasses of this type using corresponding gel formers.

BACKGROUND OF THE INVENTION

It is known to produce fireproofing glasses by filling the spaces between the panes in a multilayer laminate with a water-containing gel (so-called fireproofing laminate glasses).

Such fireproofing laminate glass panes have been in use for some time as so-called F glazing. They have the effect that, on contact with flames on one side, the side of the pane facing away from the fire ensures sealing of the room for a certain time and its temperature does not exceed about 180° C. So-called G glazing only ensures room sealing for a certain time.

Known F glazing contains a layer of clear, water-containing gel between individual glass panes in the form of an optionally multilayer sandwich construction. In general, the achievable resistance time of such constructions for a given glass type and a given gel layer thickness depends on the number of individual gel intermediate layers present in the laminate.

Examples of gel layers employed are alkali metal silicate gels or gels comprising water-compatible, crosslinked organic polymers, for example of the polymethacrylic acid type. These gels have the ability to ensure the F resistance times given in each case. If, however, in the case of contact with flames the gels are dehydrated, burnt or melted at high temperature, the final pane of the laminate facing away from the flames is melted out of the frame particularly easily, and temperatures of above 600° C. then prevail, so that there,is no significant resistance for longer room sealing beyond the F resistance time. This is particularly evident when inexpensive float glasses and alkali metal silicate gels are used. However, room sealing beyond the F resistance time is desired in order to achieve an extended residual protective action.

EP-B 306 677 describes, as fireproofing gels, combinations of monoaluminium hydrogen phosphate and boric acid in a weight ratio of from 10 to 25 in the form of 80% strength by weight and more highly concentrated solutions which have an extrudable, gel-like character but become molten in the event of a fire and can run out of the burst pane into the flame space, casting doubt on the protective effect.

To avoid such difficulties, DE-A 4 020 459 describes a gel system in which an acrylic acid derivative and a photoinitiator are dissolved in an aluminium phosphate solution and this solution is polymerized by exposure to light after introduction between glass panes. The polymerization to be carried out and the additional handling of acrylic monomers constitute a disadvantageous complication. In addition, this gel system tends to exhibit crystalline material causing turbidity.

DE-A 4 023 310 and DE-A 4 126 702 describe fireproofing gels of aluminium tris-phosphate ethanolamine salts, which can be used inter alia for fireproofing laminate glass panes. Such gel layers are very suitable for production without complications of fireproofing laminate glass panes but are still worthy of improvement with regard to the melt behaviour of flame application.

According to a prior proposal of the Applicant (German Application P 42 26 044.2), aqueous solutions of ethanolamine salts of aluminium phosphates are modified with 2 to 5 moles of boric acid (for example in the form of its ethanolamine salts) per mol of aluminium phosphate. If such solutions are to be used as an intermediate layer for fireproofing laminate glass panes, good results are obtained only with the addition of gel formers of other types, for example acrylamide. In the case of such systems, the boron content is relatively high and, here too, the practical necessity of additional handling of acrylic monomers and the polymerization thereof constitute a complication of the preparation process for fireproofing laminate glass panes.

SUMMARY OF THE INVENTION

Fireproofing glasses containing gels which are free of organic gel formers have now been found, which are characterized in that they have been prepared with gel formers which contain a) acidic aluminium phosphates, optionally in the form of reaction products with 0.01 to 4 mol of alkanolamines per mol of aluminium phosphate, and b) reaction products of boric acid with alkanolamines, a) and b) being present in a weight ratio of 100:55 to 100:0.5, calculated as solids. These fireproofing gel formers are easier to handle than those known to date.

Such gel formers can be converted into gels by heating in the spaces between the panes of a laminate comprising a plurality of panes, and fireproofing glasses can thus be obtained. Suitable temperatures for the gel formation are, for example, those in the range from 45° to 100° C.

DETAILED DESCRIPTION OF THE INVENTION

A particular embodiment of the gel formers to be used according to the invention is characterized in that they contain about 0.5 to 85% by weight of water and aluminium, boron, phosphorus and alkanolamine, in particular monoethanolamine, in atomic or molar ratios of Al:B:P:alkanolamine
1:1.2 to 1.8:2.3 to 3.7:2.3 to 3.7.

The water content is understood as being the amount of water which escapes on drying at 80° C. and atmospheric pressure until constant weight is reached. Since the final amounts of water are dried out of the system only with difficulty, the lower limit of the water content (0.5% by weight) can be stated only as an approximate figure. The water content is preferably 15 to 60% by weight.

The atomic or molar ratio of

Al:B:P:alkanolamine
is preferably
1:1.3 to 1.7:2.4 to 3.6:2.4 to 3.6 and particularly preferably:
1.4 to 6:2.8 to 3.2:2.8 to 3.2.

Very particularly preferably, the atomic or molar ratio of

Al:B:P:alkanolamine
is
1:1.5:3:3.

Suitable acidic aluminium phosphates are, for example, aluminium salts of oxo acids of phosphorus, in particular of those of pentavalent phosphorus, which are acidic in an aqueous medium. Reaction products of one atom equivalent of aluminium ($Al^{3+}$) in the form of alumina and/or aluminium hydroxide with 2.3 to 3.7, preferably with 2.8 to 3.2, moles of or thophosphoric acid are preferred. These reaction products may be present in an aqueous medium in concentrations of up to 90% by weight and are then clear liquids. The concentration of such reaction products in the aqueous medium is preferably between 50 and 85% by weight.

If desired, aluminium phosphates can be reacted exothermically, in an aqueous medium, in this concentration, with 0.01 to 4 moles of alkanolamine, relative to 1 mol of alumminium phosphate.

Preferred gels to be used according to the invention can be prepared, for example, by first reacting an aluminium compound capable of aluminium phosphate formation, in particular aluminium hydroxide, and a phosphorus compound capable of aluminium phosphate formation, in particular orthophosphoric acid, in the desired Al : P molar ratio in the presence of water at, for example, 70° to 120° C. to give an aluminium phosphate solution. This may have, for example, a solids content of at least 40% by weight, preferably 70 to 85% by weight. This solution is preferably allowed to ripen for at least 2, particularly preferably 4 to 40, hours at 10° to 40° C.

Separately therefrom, a boron compound capable of alkanolamine salt formation, in particular orthoboric acid, and an alkanolamine, in particular ethanolamine, can then be combined in the desired B : alkanolamine molar ratio in the presence of water, and the preferably aged aluminium phosphate solution can be added to this solution in the desired molar ratio. A solution of fireproofing gel formers to be used according to the invention then forms with moderate heating to, for example, about 75° C. to 95° C. After cooling to, for example, below 45° C. this solution can be readily stored and has a low viscosity.

The formation of gels to be used according to the invention can be achieved, for example, between the glass panes of a laminate comprising two or more panes by heating for 3 to 80 hours, preferably 10 to 40 hours, to one or more temperatures in the range of, for example, 45° to 120° C., preferably 60° to 95° C. At temperatures above 100° C. it may be necessary to carry out gelling in a closed system. The gel formation can be carried out directly with freshly prepared gel former solution. However, it is preferable to store the gel former solution for at least 24 hours at room temperature before gel formation.

The boron/alkanolamine solution may contain, for example, 40 to 100% by weight of solids, and the aluminium phosphate solution, if necessary preferably after appropriate dilution, as a solution containing 40 to 75% by weight of solids, is combined with the boron alkanolamine solution.

The alkanolamines to be used may also contain ether groups. Preferred alkanolamines are those which are obtainable by reaction of amines or ammonia, preferably aliphatic amines having one or more amino groups or ammonia, with up to 50 mol of alkylene oxide, preferably ethylene oxide and/or propylene oxide, per NH group. Monoethanolamine is very particularly suitable as the alkanolamine. Amine mixtures may also be used.

If desired, 0.01 to 4 mol of alkanolamine may be used per atom equivalent of aluminium ($Al^{3+}$) for the reaction of acidic aluminium phosphates with alkanolamines. Preferably, the amount of alkanolamine used is no more than that required for achieving a pH of 8 (in aqueous, 50% strength by weight medium). In the case of aluminium dihydrogen phosphate [$Al(H_2PO_4)_3$], it is possible to use, for example, 2 to 4 mol, preferably 2.3 to 3.7 mol, of monoethanolamine.

All oxo acids of boron are in principle suitable as boric acid, in particular orthoboric acid, and precursors thereof, for example boron oxides and hydrated boron oxides, from which orthoboric acid can form as a result of hydrolysis. The statements made above for the reaction with aluminium phosphates are applicable in corresponding form for the alkanolamines to be used for the reaction with the boric acid. Here too, monoethanolamine is preferred.

In general, 0.5 to 4, preferably 1.3 to 3.1, mol of alkanolamine are used per atom equivalent of boron ($B^{3+}$) in the form of boric acid or boric acid precursors. The reaction may be carried out in the absence of water but is advantageously effected in an aqueous medium in concentrations such that the reaction product is then present in the aqueous medium in a concentration of 50 to 100, preferably 60 to 100, % by weight.

Gel formers to be used according to the invention, which contain reaction products of aluminium phosphates with alkanolamines and boric acid with alkanolamines, preferably have the same amine or alkanolamine or alkanolamine mixture in each of the two reaction products.

In a further procedure, a separate boron-containing component which also contains aluminium, for example in a molar ratio of aluminium to boron (Al:B) of 1:2 to 1:10, preferably 1:3 to 1:6, is first prepared from an acidic aluminium phosphate and a reaction product of boric acid and alkanolamine in an aqueous medium, and this boron-containing component is then mixed, in an aqueous, for example 50 to 70% strength by weight medium, with further acidic aluminium phosphate or with a reaction product of acidic aluminium phosphate and alkanolamine, and is caused to react. Here too, care should be taken to ensure that the stated gross weight ratios of aluminium to phosphorus to boron to alkanolamine as described above are maintained.

It is also possible, but less preferable, to react a reaction product of acidic aluminium phosphate and alkanolamine, which reaction product is present in an aqueous medium, with corresponding amounts of boric acid or precursors thereof, it also being possible for the gel formers to be used according to the invention and having the required gross composition to be formed. In a comparable manner, it is possible, for example, first to react orthophosphoric acid with alkanolamine, then to react boric acid and then aluminium hydroxide therewith in an aqueous medium, a gel former to be used according to the invention also finally being obtained.

This means that the order of the steps which lead to the preparation of the gel formers to be used according to the invention can be varied within a wide range.

The preparations of the aluminium-containing component and of the boron-containing component are preferably carried out at temperatures between 20° and 100° C. and in an aqueous medium in which the individual component is finally present in a concentration between 50 and 85% by weight. Mixing of the aluminium-containing component with the boron-containing component is carried out in general at 18° to 95° C. If necessary, it is possible briefly to heat up to about 100° C. Excessively long heating to temperatures above 40° C. should be avoided in the case of all components and component mixtures, since otherwise premature gelling or an increase in viscosity may occur.

Instead of the preferably used two-pot process in which an aluminium phosphate solution and a boron/alkanolamine salt solution are first prepared and the two solutions are then combined by stirring or in a continuous mixer, one-pot processes may also be used.

It is also possible initially to use high solids concentrations and then to reduce these before, during or after the formation of the gel former solution by dilution.

Additives, for example surfactants, adhesion promoters, colourants, pore nucleating agents, fillers, light stabilizers, antioxidants and/or reinforcing agents, for example fibres, nets and the like, may optionally be added to the gels to be used according to the invention, the starting materials for their preparation or the corresponding gel formers. Such additives are known per se.

One of the important advantages of the gel formers to be used according to the invention, in addition to freedom from alkali metals, is that their viscosity is substantially below the viscosity of a corresponding boron-free aluminium phosphate/alkanolamine gel former of the same concentration, even at solids contents of more than 60% by weight in an aqueous medium.

This means that gel formers to be used according to the invention have a better shelf life and, owing to the reduced viscosity, the spaces between the panes of a pane laminate can be filled considerably more easily, more quickly and with fewer bubbles than in the case of boron-free gel formers based on aluminium phosphate. Work may optionally be carried out under vacuum or protective gas in order to prevent bubble formation and/or discoloration.

Even with the addition of amounts of about 10% by weight of the boric acid/alkanolamine component (relative to the sum of the boric acid/alkanolamine component and the aluminium phosphate component), a gel former having greatly reduced viscosity which forms a gel which remains clear for 200 hours at 80° C. is obtained.

The gel former solutions have a good shelf life, even at temperatures of up to about 40° C. The gels form within a few hours as clear, heat-stable gels which are distinguished by good mechanical stability and, surprisingly, do not tend to flow on flame application at temperatures in the range from 100° to 600° C.

In contrast to gels which are obtained without the addition of boron alkanolamine reaction products or with the addition of insufficient amounts of boron component or with the use of excessive amounts of boron or alkanolamine, at temperatures above 100° C. gels to be used according to the invention no longer tend to form a flowing melt which can flow away on flame application. This is a technically important, surprising advantage of the gels to be used according to the invention.

It is also possible to combine the individual components in another way, for example if it is desired to carry out all or some of the process continuously and/or in a one-pot process. For example, it is possible first to carry out a reaction of the aluminium phosphate solution with the alkanolamine and then to add the boron compound, or first to react the boron and/or phosphorus compound with an alkanolamine and then to add, for example, freshly precipitated aluminium hydroxide.

Furthermore, gels to be used according to the invention have improved fine-pore intumescence. The gel former solutions have relatively low viscosities even at solids concentrations of more than 65% by weight. Even in the case of dilutions to a solids content of less than 40% by weight, they are still gellable and have in general moderate pH values of between 5 and 6. The gels formed therefrom and free of additional gel formers have a substantially reduced tendency to crack and tend not to flow at elevated temperatures, so that the hydrostatic pressure of the pane laminates can be absorbed well even in the case of relatively weak panes. In addition to the good storage stability at constant, even elevated temperatures, the gels also have good stability during storage under conditions of changing temperature, for example at temperatures fluctuating between −18° C., +20° C. and +80° C. Finally, the high F and in particular G resistance times of the fireproofing glasses according to the invention are worthy of mention.

Firproofing glasses according to the invention may contain the gels to be used in dried or water-containing form.

The gel formers and gels to be used according to the invention may optionally additionally contain, for example, surfactants, for example organofluorine, non-ionic and/or ionic surfactants, other added auxiliaries, for example sugars or polyalcohols for influencing the intumescence behaviour in the case of fires, or auxiliaries for improving the adhesion of the gel on glass panes, as well as colourants and/or light stabilizers and radiation stabilizers. The water contents before and after gelling are in general less than 50% by weight, preferably between 20 and 40% by weight. The gels in the various spaces between the panes of a pane laminate may have identical or different compositions of the solids contents and of the water contents.

It is also possible in specific cases to apply a gel former to be used according to the invention to a glass pane and to gel it and/or to dry it there, i.e. not in a space between panes, but on a glass surface. At temperatures between room temperature and 150° C., preferably between 80° and 120° C., water contents lower than 20% by weight can then also be realized in a simple manner.

In the fireproofing glasses according to the invention, it is of crucial importance that it is possible first to prepare a gel-former solution which has a long shelf life at room temperature and, after introduction between the glass panes of a pane laminate, can be converted into a stable gel without further additives by warming for a few hours.

The sum of the advantages of the present invention constitutes a considerable technical advance in the area of fireproofing glasses.

In the case of the preparation of gels to be used according to the invention, other aluminium compounds which can be converted into aluminium phosphates, for example aluminas, hydrated aluminas, aluminium salts of volatile acids (for example aluminium chlorides, carbonates or acetates) or aluminium borates, may also optionally be used, in addition to or instead of the preferred aluminium hydroxide. In addition to aluminium compounds, it is possible to use, for example in an amount of up to 20 mol %, relative to aluminium, other metal compounds, for example those of the 1st to 4th main group of the Periodic Table of Elements and/or of iron, cobalt and/or nickel.

Other phosphorus compounds which can be converted into aluminium phosphates, for example dehydrated forms of orthophosphoric acid, phosphorus oxides, phosphonic acids, phosphinic acids, phosphoric esters and/or phosphoric acid salts, the latter, for example, in the form of ammonium and/or alkanolamine salts, may optionally be used in addition to or instead of the preferred orthophosphoric acid.

Other boron compounds, for example dehydrated forms of orthoboric acid, boron oxides, ammonium borates and/or borates of other amines, in particular alkanolamine borates, may optionally be used in addition to or instead of the preferred orthoboric acid.

Other alkoxylation products of ammonia, such as diethanolamine and triethanolamine, and/or other amine compounds, for example ammonia, ethylenediamine, polyalkylenepolyamines, piperazines and/or morpholines, may optionally be used in addition to or instead of the preferred ethanolamine.

Suitable glasses for fireproofing glasses according to the invention are inorganic and organic glasses of the prior art, for example soda-lime glasses, float glasses, boron-containing silicate glasses, glass-ceramic, polymethacrylate glasses, polycarbonate glasses and polyolefin glasses.

In the case of gel formers and gels to be used according to the invention no addition of monomers (acrylamide) is required and complications due to its handling and polymerization are dispensed with. Nevertheless, gel formers and gels to be used according to the invention may optionally be combined with other gel formers or gels, for example with (poly)acrylamide, polyvinyl alcohol, starch, gelatine, proteins or montmorillonites.

The gel former solutions can optionally be further diluted before gelling. A preferred diluent is water, but the addition of water-miscible organic solvents is also possible, at least in a proportionate amount.

In addition to the additives already mentioned, additions of carbonizing polyalcohols, for example sugars, glycols, glycerol, pentaerythritol and/or polyvinyl alcohols, and other water-soluble oligomeric or polymeric additives, are also suitable. In specific cases, provided that clear gel layers are not required, polymer dispersions may also be mixed with gels or gel former solutions to be used according to the invention. Adhesion promoters, surfactants, light stabilizers, UV and IR filter substances and colour-imparting additives are optionally added, for example in amounts of less than 3% by weight, preferably less than 1% by weight, relative to the gel to be used according to the invention. Fillers and carbonizing additives can optionally be used, for example, in amounts of from 1 to 75% by weight, preferably 20 to 60% by weight, based on the total mixture.

The invention is illustrated below by way of example. The stated parts and percentages relate to the weight, unless stated otherwise.

EXAMPLES

Example 1

A 55% strength solution of 1 mol of aluminium phosphate in the form of a reaction product prepared at 100° C. in water from 1 mol of aluminium hydroxide with 3 moles of 85% strength orthophosphoric acid was stirred with 3.1 mol of ethanolamine, beginning at 20° C. During this procedure, the temperature increased to 75° C. After a few minutes, the solution was clear and was cooled to 20° C. The solids content was 66% by weight. After 16 hours at 20° C. a viscosity of 3800 mPa.s was measured (Haake Viscotester VT 02/1).

A 66% strength solution in water of the reaction product of 1 mol of orthoboric acid and 1 mol of monoethanolamine was prepared.

9 parts of the aluminium-containing solution and 1 part of the boron-containing solution were then mixed at room temperature and a clear solution was obtained. This was stored for 16 hours at 20° C. and the viscosity was then determined as above. It was 630 mPa.s.

Thereafter, the mixture was introduced into a glass bottle and placed in a heating oven heated to 80° C. After 4 hours, the material had gelled; after 12 hours, it was removed from the heating oven and cooled. A clear stable gel had formed.

The bottle containing the gel was then once again introduced into the heating oven heated to 80° C. and left therein for 180 hours. Thereafter cooling was carried out. No opacity of the gel was found.

Example 2

A 70% strength solution of 1 mol of aluminium dihydrogen phosphate in water was first prepared. A 70% strength solution of the reaction product of 5 mol of orthoboric acid and 5 mol of monoethanolamine was added to this solution at 50° C. Gentle heating gave a clear solution, which was diluted to a content of 66%. It was then mixed with the 66% strength solution of an aluminium phosphate/ethanolamine component (prepared as in Example 1) in the ratios shown in the Table, the viscosities likewise mentioned being subsequently measured as in Example 1.

| % of aluminium-containing component | *) 100 | 90 | 80 | 70 | *) 50 |
| --- | --- | --- | --- | --- | --- |
| % of boron-containing component | — | 10 | 20 | 30 | 50 |
| Viscosity (mpa · s at 20° C.) | 3800 | 1080 | 870 | 700 | 580 |

*) For comparison

All these mixtures were introduced separately for 24 hours into a heating oven heated to 80° C. and were then cooled. It was found that all samples, except for the 50%/50% sample, had formed a clear stiff gel. The 50%/50% sample could not be gelled even with longer heating.

The two first-mentioned samples (100%/0% and 90%/10%) were kept at 80° C. for a further 180 hours. No changes were detectable. This means that the improved handling properties as a result of lower viscosity are not accompanied by a deterioration in the ageing resistance.

Example 3

In each case, a three-pane laminate glass construction comprising 3 mm float-glass panes with two intermediate spaces each with a gap of 3 mm was filled with the second solution from Example 2 (90%/10% mixture) and with the first solution from Example 2 (100%/0% mixture). It was evident that the filling with the second solution could be carried out significantly more quickly and more easily without bubbles than with the first solution.

The laminate glass construction containing the second solution was then gelled by heating at 90° C. for 12 hours.

The laminate glass construction measuring 30×30 cm and containing the second solution was then installed in a small-fire test oven operating according to DIN 4102, and treated with a flame in accordance with the standard temperature curve. After about 100 seconds, the pane began to become cloudy, and after 5 minutes radiation blockage due to cloudiness had been fully reached. After a flame-treatment time of 30 minutes, the average temperature of the side of the laminate glass construction facing away from the flame was still below 180° C. (infrared photometric measurement), and after 120 minutes room sealing was still ensured, the average temperature of the outer surface being 640° C. and the oven temperature being 1000° C.

Example 4

Preparation of an Al Phosphate Solution (not according to the invention)

624 parts of hydrargillite (technical-grade aluminium hydroxide) were introduced into 2766 parts of 85% strength orthophosphoric acid (molar ratio Al : P 1:3) and 262 parts of water and stirred at 100° to 110° C. for 4 hours. A clear solution having a solids content of 70% was formed. This was diluted to 65% with 279 parts of water and cooled to room temperature. This solution is referred to below as AP solution.

Example 5

Preparation of a Solution of a Boric Acid/Ethanolamine Complex (not according to the invention)

741.6 parts of orthoboric acid were dispersed in 1187.6 parts of water, and 1464 parts of ethanolamine (molar ratio B: amine 1:2) were added with thorough stirring. The temperature increased to about 45° C. and a clear, 65% strength solution was formed. The solution was cooled to room temperature. This solution is referred to below as BE solution.

Example 6

Preparation of a Boron-Free Complex From the AP Solution and Ethanolamine in a Molar Ratio Al:P:amine=1:3:3 for Comparative Purposes (not according to the invention)

625 parts of the AP solution (after storage for 40 hours at room temperature) were diluted to 55% with water. 210 parts of ethanolamine were then added with thorough stirring. The reaction mixture was heated to 75° C., and a clear solution formed. The solution was cooled to room temperature in the course of 15 minutes and adjusted to a solids content of 65% with 17 parts of water. After ripening for 30 hours at room temperature, the solution had a viscosity of 3500 mPa.s, measured at 20° C. with the Haake Viscotester. This solution is referred to below as APE solution.

Example 7

Preparation of a Gel Former Solution to be Used According to the Invention 212 parts of BE solution were initially introduced into a stirred pot, and 244.6 parts of AP solution (ripened for 4 hours at room temperature) were added with thorough stirring at 85° C. The molar ratio was 2:3, corresponding to the composition $AlB_{1.5}P_3amine_3$. Heating to 70° C. gave a clear, 65% strength gel former solution, which was immediately cooled to room temperature. After ripening for 24 hours at room temperature, the solution had a viscosity of 600 mPa.s at 20° C., measured using the Haake Viscotester. This solution is referred to below as APBE solution.

The decrease in viscosity compared with the boron-free solution of Example 6, having the same concentration, is evident from the measured viscosity.

Example 8 (not according to the invention)

Gelling of the APE Solution, of the AP Solution and of the BE Solution for Comparative Purposes One test tube in each case was half-filled with the BE solution, with the AP solution (aged for 40 hours at room temperature) and with the APE solution (aged for 40 hours at room temperature), and the test tubes were closed. The three test tubes were then placed horizontally and heated for 12 hours at 80° C. After this time, the BE solution and the AP solution were still liquid while the APE solution had gelled to give a mechanically stable, clear gel which did not coalesce when the tube was placed in a vertical position at room temperature (the latter gel is referred to below as gel 8).

The AP solution and the BE solution did not gel even on prolonged heating.

Example 9

Gelling of the Gel Former Solution APBE to be Used According to the Invention

A procedure analogous to Example 8 was used with the APBE solution from Example 7. A clear, mechanically stable gel which did not coalesce in the vertical position both at room temperature and at 80° C. was likewise obtained (this gel is referred to below as gel 9).

Example 10

Comparison of the Melting Behaviour of Gel 8 and Gel 9 a)

The test tubes obtained according to Examples 8 and 9 and half-filled with stable gel in the horizontal position were placed vertically and subjected laterally to a heated air stream, the temperature of which increased from 20° to 300° C. in the course of 30 seconds and then remained at 300° C. (hot-air blower). The melting behaviour of the gels was assessed:

Gel 8 melted within 30 seconds and coalesced at the bottom of the vertical test tube to give a bubbling melt. After 1 minute, the major part of the gel had coalesced to form a melt at the bottom of the test tube.

In the case of gel 9, no melting and coalescence occurred. During the thermal stress, a large number of small cracks and small bubbles formed in the gel without the latter running away in liquid form. In the course of 60 seconds, the entire gel had swelled up, without running, to give a mass containing fine bubbles.

b)

The same phenomena were observed as the temperature of the hot air stream was increased to 500° C. in a corresponding experiment.

Experiments a) and b) show the good melt stability of the gel to be used according to the invention which makes it particularly suitable for the preparation of fireproofing glasses.

Example 11

Continuous Preparation of a Gel Former Solution to be Used According to the Invention A metering pump delivered 74 parts by volume per minute of an AP solution aged for 25 hours at room temperature. A second metering pump delivered 94 parts by volume per minute of a BE solution aged for 25 hours at room temperature.

Both metering pumps delivered to a stirrer mixing head as customarily used for polyurethane production. In the high-speed mixing head, the components were mixed very rapidly and very thoroughly. The mixing head was followed by a 10 m long transport pipe which had, in the middle, a static mixer by means of which the reaction mixture was subsequently mixed. The clear colourless reaction mixture then flowed over a cooler and, at about 35° C., into storage vessels in which it cooled to room temperature.

In the gelling experiment analogous to Example 9, a clear gel was obtained, which corresponded in its properties to the gel tested according to Example 9.

Example 12

Preparation of a Fireproofing Glass Laminate According to the Invention

Three-pane laminates sealed by means of silicone sealant and measuring 50×50×1.5 cm were produced and fixed vertically between two steel plates. The construction of the laminate was: 3 mm float glass/3 mm space/3 mm float glass/3 mm space/3 mm float glass.
a) The spaces between the panes of the laminate were filled with APE solution (see Example 6).
b) The spaces between the panes of a second laminate were filled with APBE solution (see Example 7).

The two laminates in fixed form were then introduced into a heating cabinet and conditioned at 80° C. for 25 hours. They were then allowed to cool in the course of 10 hours. The fireproofing laminate glasses produced in this way were clear and transparent. Due to the mechanically stable gel formed, it also had no tendency toward deformation due to a hydrostatic pressure of the fillings.

A 50-cycle alternating temperature storage test (10 hours at each of –10° C., room temperature and 80° C.) showed no evidence of impairment of the laminate glasses.

Comparison

The two laminates 12a) and 12b) were stored for 2 months at room temperature and installed in a small-fire oven operated in accordance with DIN 4102 with the standard temperature curve. The flame-treatment test was then started.

In both cases, the glass pane on the flame side cracked after about 1 to 2 minutes. After about 3 minutes, cloudiness of the pane was clearly evident in each case.

After about 6 minutes, flow and formation of floating bubbles was evident in 12a), and after 10 minutes the contents of the interpane space on the flame side had partly run out, but began to partly fill up again due to intumescent foaming. After about 15 minutes, the middle pane cracked, the second gel layer began to melt, and the same phenomena repeated themselves.

In the meantime, the pane on the side facing away from the flames had also become opaque. However, some heat nests formed on the pane surface, which was found by scanning with an IR measuring instrument. In the region of these heat spots, temperatures of above 160° C. were measured after 27 minutes. The average temperature of the laminate 12a) reached values of above 180° C. after 34 minutes.

In the case of laminate 12b), fine bubbles were increasingly evident in the gel layer after 6 minutes, without evident flow or run-out processes, which increasingly took on the character of a fine-pore foam over the entire duration of the experiment. From an experimental duration of about 15 minutes, this foaming process also occurred in the second gel layer. Even after a burning time of from 25 to 30 minutes, there were no clear heat spots on the pane surface. After 43 minutes, the outer pane surface reached an average temperature of 180° C. The laminate 12b) was then partly filled with a fine-pore foam.

Both pane laminates provided complete room sealing even after a burning time of 120 minutes. The experiment was then terminated, and the flame-side front was assessed after cooling.

In the case of 12a), it was found that significant amounts of the original gel filling had run out of the burst panes and had entered the fire space, where they had vitrified. The remainder of the gel melt layer had solidified on the resultant parts of the glass panes with ceramisization, thus preventing melting of the front pane, maintaining the room sealing.

In the case of 12b), it was evident that virtually no material had run out into the fire space, and that the entire surface on the flame side represented a type of fine-pore foam cushion plus ceramisized material. This enables room sealing to be maintained for virtually as long as desired.

These fire tests demonstrate the significantly improved suitability of gels to be used according to the invention for fireproofing gel interlayers in fireproofing glasses (see in each case 12b)).

Example 13

Production and test of pane laminates a)

A float glass pane measuring 50×50×0.3 cm was coated with the APBE solution obtained as described in Example 7, and the coating produced in this way was dried at 90° C. The resultant tack-free coating of the pane was clear and streak-free, and the thickness of the coating was 0.55 mm. The pane was then installed in a small-fire oven with the coating on the side towards the flames, an uncoated comparative pane was also installed, and the oven was heated to 100° C. in the course of 15 minutes by means of fuel gas. The panes did not crack. The oven temperature was then increased slowly to 1000° C. over the course of 2 hours.

On reaching 700° C., the uncoated float-glass pane began to melt, and the room sealing was lost. By contrast, the coated float-glass pane became coated on the flame side with a ceramicized and foam-like layer and thus represented not only a radiation barrier, but also ensured room sealing at 1000° C. for more than 30 minutes.

b)

Experiment a) was repeated, but a corresponding two-pane laminate was employed in which the coating of the single pane had been dried to a residual moisture content of 15% (measured at 80° C.), and a second pane was then pressed on at 50° C.

In this case too, room sealing was ensured at 1000° C. for more than 30 minutes.

What is claimed is:

1. A fireproofing glass laminate structure having a gel coated on a glass pane or intermediate between glass panes, whrein said gel is a gel free from crosslinked organic polymers, which has been prepared with gel formers which contain a) an acidic aluminum phosphate and b) a reaction product of boric acid with an alkanolamine, a) and b) being present in a weight ratio of 100:55 to 100:0.5, calculated as solids.

2. The fireproofing glass of claim 1, in which the acidic aluminium phosphate is a reaction product of 0.01 to 4 mol of an alkanolamine per mol of aluminum phosphate.

3. The fireproofing glass of claim 1, which has been prepared with a gel former which contains about 0.5 to 85% by weight of water and aluminium, boron, phosphorus and alkanolamine in atomic or molar ratios of

| Al:B:P:alkanolamine | | | |
|---|---|---|---|
| 1 | 1.2 to 1.8 | 2.3 to 3.7 | 2.3 to 3.7 |

4. A process for the preparation of a fireproofing glass of claim 1, in which the gel former to be used is allowed to gel between the glass panes of a laminate comprising two or more panes by warming for from .3 to 80 hours at temperatures in the range from 45° to 120° C.

5. The fireproofing glass of claim 1, in which one or both of gel former and gel contains one or more of surfactants, adhesion promoters, colourants, pore nucleating agents, fillers, light stabilizers, antioxidants and reinforcing agents.

6. The fireproofing glass of claim 1, which contains a gel in dried form.

7. The fireproofing glass of claim 1, which contains a gel in water-containing form.

8. The fireproofing laminate glass of claim 1, which comprises one or more glass panes to which gel formers to be used according to the invention have been applied and dried.

9. A fireproofing laminate glass construction containing at least one float-glass pane and at least one layer of the gel defined in claim 1.

10. The fireproofing laminate glass of claim 9, containing a gel containing less than 50% by weight of water.

11. The fireproofing laminate glass of claim 9, containing a gel containing 20 to 40% by weight of water.

* * * * *